April 30, 1929.   W. L. REMICK   1,711,326
APPARATUS FOR THE SEPARATION OF COMBUSTIBLE MATERIAL
FROM ITS ASSOCIATED NONCOMBUSTIBLE MATERIAL
Filed Feb. 18, 1926   2 Sheets-Sheet 1
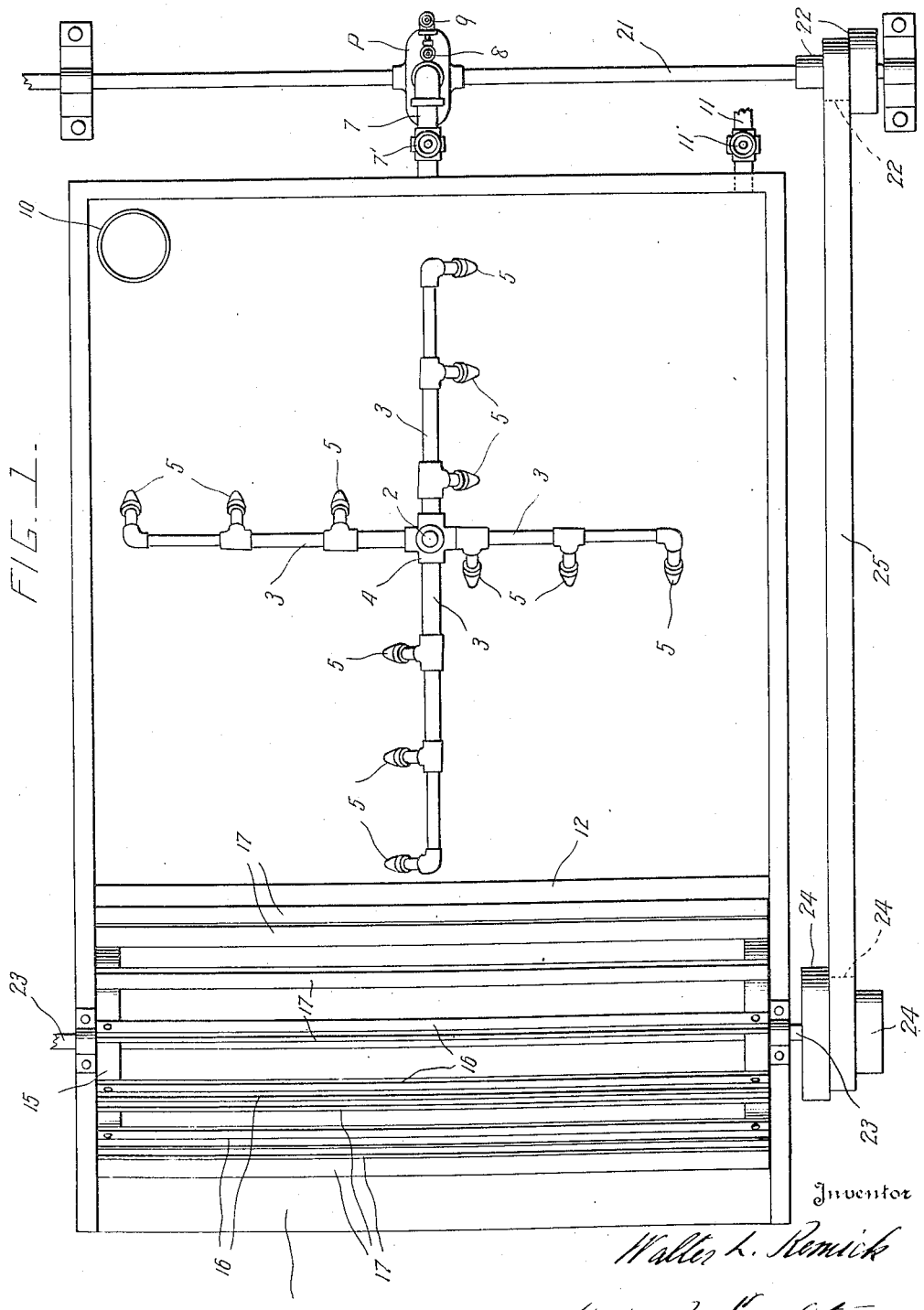

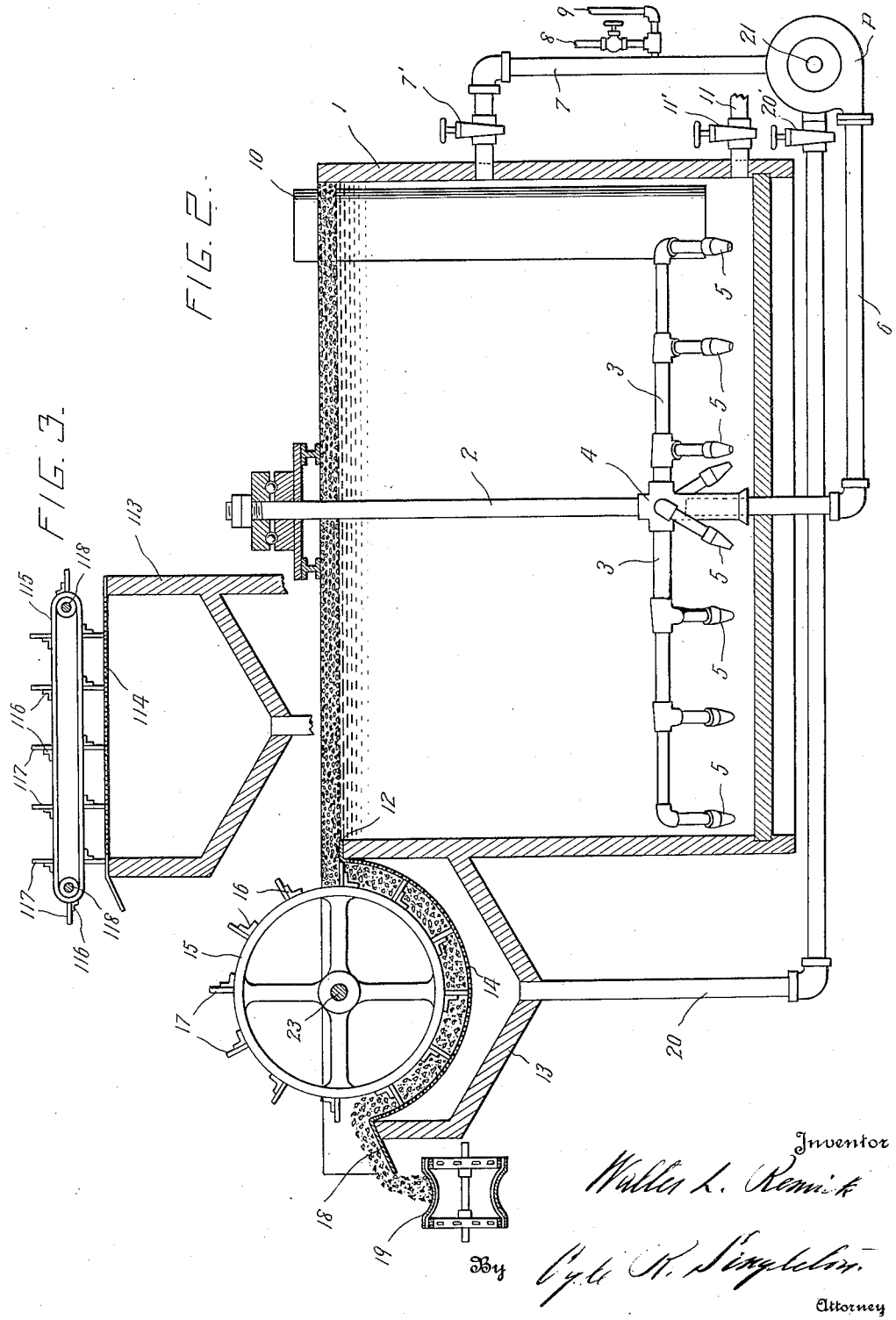

Patented Apr. 30, 1929.

1,711,326

UNITED STATES PATENT OFFICE.

WALTER L. REMICK, OF NEW YORK, N. Y.

APPARATUS FOR THE SEPARATION OF COMBUSTIBLE MATERIAL FROM ITS ASSOCIATED NONCOMBUSTIBLE MATERIAL.

Application filed February 18, 1926. Serial No. 89,141.

My invention consists in a new and useful improvement in apparatus for the separation of combustible material from its associated non-combustible material, and is designed more particularly for the recovery of pulverized coal from a mixture of coal and slate.

My process consists in subjecting the pulverized mixture of coal and slate to the effect of an upward current of fluid in a tank, admitting oil and air to the fluid mass, and dewatering the floated mass of coal.

In the drawings filed herewith, I have illustrated one specific embodiment of my improved apparatus by which my improved process can be practiced, but it is to be distinctly understood that I do not consider my invention, as to my process or my apparatus, limited by the description and illustration of this specific embodiment, but refer for its scope to the claim appended hereto.

In the drawings:

Fig. 1 is a top plan view of my apparatus.

Fig. 2 is a vertical section.

Fig. 3 is a vertical sectional view of a modified form of dewatering device.

In the drawings, the numeral 1 designates a rectangular, fluid containing tank. Suitably supported and centrally disposed relative to the tank 1 there is the vertical, rotatable shaft 2. Mounted upon the lower end of the shaft 2 are the horizontally disposed, outwardly extending, hollow arms 3 connected with the cross 4, and provided with tangentially directed, downwardly disposed nozzles 5. A pipe 6 communicates with the nozzles 5 through the cross 4 and arms 3. This pipe 6 is connected with the discharge side of a centrifugal pump P. I provide an intake pipe 7 communicating with the interior of the tank 1, connected to the intake side of the pump P, and provided with the valve 7'. Connected with the pipe 7 are the pipes 8 and 9 for the supply of air and oil respectively. The tank 1 is provided with a feed shell 10 extending downwardly into the tank 1 and having its open discharge end near the bottom of the tank 1, slightly above the plane of the nozzles 5. The tank 1 is also provided at its bottom with a discharge pipe 11 having a valve 11'. Along the top of one side of the tank 1 there is provided an overflow lip 12.

Disposed alongside of the tank 1 adjacent this overflow lip 12, there is a dewatering device comprising a shallow tank 13 provided with a cover, consisting of a perforated, arcuate screen 14. Suitably mounted above the screen 14 is the rotatable drum 15 carrying longitudinal scraper bars 16 provided with squeegees 17, the parts being so disposed that rotation of the drum 15 causes the squeegees 17 to travel over the screen 14 in close contact therewith. The tank 13 is provided on the outerside with the discharge lip 18, below which I provide a suitable belt conveyor 19. The tank 13 is provided at its bottom with a pipe 20 having a valve 20' and connected with the intake side of the pump P.

I provide a suitable drive shaft 21 for driving the pump P, and having thereon power pulleys 22 of varying diameter. I provide the drum 15 with a drive shaft 23 having thereon pulleys 24 of varying diameters, the shaft 23 being driven by the shaft 21 by means of a belt 25. Different speeds for the drum 15 may be obtained by selective ratios of the pulleys 22 and 24.

In the modified form of dewatering device, illustrated in Fig. 3, the tank 113 is provided with a flat, perforated screen cover 114, above which is suitably mounted the endless belt 115, carrying the scraper bars 116 having the squeegees 117, the parts being so disposed that when the belt 115 is caused to travel by the rotation of suitably driven rollers 118, the squeegees 117 are caused to travel over the screen 114 in close contact therewith.

From the foregoing description of the details of construction of my improved apparatus, its use and operation in the practice of my improved process will be obvious. Mixed coal and slate are fed into the tank 1 through the feed shell 10, and delivered on the bottom of the tank 1. The arms 3 with nozzles 5 revolve under impulse of water supplied by pump P. The coal is floated and the slate remains. It is intended that all coal shall have been removed by the time the nozzles 5 have washed the slate around to the discharge pipe 11. Oil and air are aspirated through pipes 9 and 8 respectively. Only the smallest particles of coal are oiled. In this respect the apparatus is different from any other flotation apparatus known. It has been proven by experiments that this fine coal in an oiled state, together with the air bubbles, picks up the coarser coal which is classified out on the bottom of the tank 1, and floats it to the surface. I claim a point of superiority here, as the amount of oil used is reduced to a minimum. In the ordinary flotation apparatus, all particles are oiled, which consumes a larger amount of oil. As soon as the coal is floated, it is carried over the overflow lip 12 and is scraped over the screen 14 by the slowly revolving squeegees 17. The water is taken through the screen 14 by the suction of the pump P acting through the pipe 20. It is intended that the scraper shall operate at such a velocity that at all times the screen 14 shall be covered with coal. This avoids "breaking" the vacuum created by the pump suction. If the screen 14 were uncovered, all the suction would be concentrated at the uncovered area, at the expense of the dewatering process. The coal is delivered to the conveyor at 19 over the lip 18.

It has been found by experiments that, when using this process wherein only the smaller coal particles are oiled, the small oiled particles adhere to the coarse particles so that none of the floated coal consisting of the large and the small particles adhering thereto will pass through the screen, even if the holes in the screen are larger than the holes in the screen through which the coal was screened previous to subjecting it to my process. This phenomenon makes it practically impossible for the holes in the screen 14 to become plugged with coal particles.

Another feature having to do with the coal floated by my process is the large size of the particles which are floated. In anthracite collieries, it is the custom to reject and not market sizes of coal that pass through a 3/32 inch round hole. It is highly advantageous that all coal of this size shall be floated. If it were possible to do so, it would be necessary to grind the coal to a finer size, which process would entail an expense that might be prohibitive. Other flotation apparatus and processes have been unable to float particles larger than about 1/50 of an inch, on a commercial scale. My process will float all the 3/32 inch coal and still larger sizes, if necessary, for the following reasons:

As explained above the air bubbles and small oiled coal particles adhere to the larger particles and exert a lifting effect thereon. In addition, there are two other influences which give an added lifting effect:

1st. Due to the action of the water from the nozzles 5, a large amount of fine coal and slate are continually in suspension between the bottom of the tank 1 and the pump intake, pipe 7. A certain amount is also suspended between the intake, pipe 7, and the floating surface, at the lip 12. This suspended matter, mixed with the water, forms a fluid of gravity higher than that of water, the actual gravity varying directly with the proportion of solids to water. The result is a lowering of the relative specific gravity of the coal particles and a corresponding increase in the buoyancy or lifting effect of the fluid on the coal.

2nd. In addition to this buoyancy, there is the lifting effect of the upward current of water flowing from the nozzles 5. It is conceivable that the combined effect of these two forces might in itself overcome the gravity of the coal and float it away from the slate. However, it is not necessary that this should be done, as the lifting effect of the air bubbles supplies the buoyancy for raising the coal to the surface.

The principles hereinbefore set out are radically different from those involved in the operation of other flotation apparatus which have been designed primarily for the flotation of sulphides from ores. Sulphide flotation is a process requiring careful selection of flotation agents and delicate adjustments of the apparatus. All sulphides are floated away from a downward moving current of ore and water. This seems necessary in the case of ore, but has been found to be unnecessary in cleaning coal. My apparatus is especially designed for floating coal.

In my apparatus perfect cleaning of the coal is obtainable by properly proportioning the amount of water overflowing with the coal with the amount taken through the regular pump intake. This controls exactly the upward current between the pump intake, pipe 7, and the overflow, lip 12. This not only controls the coarseness but also the cleanness of the floated coal. This is necessary for the reason that it is easiest for instance to clean anthracite coal down to 8 or 10% ash, whereas it is usually not desired to clean coal to that extent. The selling contract usually calls for a maximum ash content which is often about 14%. Therefore it is not advisable to clean below that figure.

Having described my invention what I claim is:

In an apparatus for treating mixed material, the combination of a tank; a pump; a pipe entering the bottom of said tank and connected to the outlet side of said pump; a second pipe entering the upper portion of said tank and connected with the intake side of said pump; an overflow on said tank; a suction tank adjacent said overflow; a screen between said overflow and said suction tank; a third pipe entering the bottom of said suction tank and connected with the intake side of said pump; and a pipe connected with a source of oil supply and communicating with the said second mentioned pipe.

In testimony whereof I affix my signature.

WALTER L. REMICK.